(12) United States Patent
Zhang et al.

(10) Patent No.: US 8,645,551 B2
(45) Date of Patent: Feb. 4, 2014

(54) METHOD FOR AUTOMATICALLY NEGOTIATING TYPE OF SERVICE AND AGGREGATION APPARATUS THEREFOR

(75) Inventors: Jun Zhang, Guangdong Province (CN); Fangzheng Qian, Guangdong Province (CN); Guanwei Liu, Guangdong Province (CN)

(73) Assignee: ZTE Corporation, Shenzhen, Guangdong Province ( * ) Notice: Subject to any disclaimer, the term of this patent is extended or adjusted under 35 U.S.C. 154(b) by 136 days.

(21) Appl. No.: 13/257,975

(22) PCT Filed: Sep. 9, 2009

(86) PCT No.: PCT/CN2009/073840
§ 371 (c)(1),
(2), (4) Date: Dec. 22, 2011

(87) PCT Pub. No.: WO2010/148590
PCT Pub. Date: Dec. 29, 2010

(65) Prior Publication Data
US 2012/0117204 A1   May 10, 2012

(30) Foreign Application Priority Data

Jun. 25, 2009 (CN) .......................... 2009 1 0148671

(51) Int. Cl.
*G06F 13/00* (2006.01)
(52) U.S. Cl.
USPC .......................... 709/228; 709/225; 709/230
(58) Field of Classification Search
USPC ......... 709/223, 225, 227, 228, 230, 232, 237, 709/250
See application file for complete search history.

(56) References Cited

U.S. PATENT DOCUMENTS

| 6,457,055 | B1 * | 9/2002 | Hwong et al. | 709/227 |
| 6,690,650 | B1 * | 2/2004 | Stener | 370/241 |
| 8,184,556 | B2 * | 5/2012 | Singh | 370/255 |
| 2007/0127920 | A1 * | 6/2007 | Ghiasi et al. | 398/25 |
| 2007/0129052 | A1 | 6/2007 | Jabri et al. | |

FOREIGN PATENT DOCUMENTS

| CN | 101080097 A | 11/2007 |
| CN | 101414925 A | 4/2009 |
| EP | 2211488 A1 | 7/2010 |
| KR | 20030080831 A | 10/2003 |
| WO | 9854870 A2 | 12/1998 |
| WO | 9950967 A1 | 10/1999 |

OTHER PUBLICATIONS

International Search Report for PCT/CN2009/073840 dated Mar. 23, 2010.

\* cited by examiner

*Primary Examiner* — Viet Vu
(74) *Attorney, Agent, or Firm* — Ling Wu; Stephen Yang; Ling and Yang Intellectual Property

(57) ABSTRACT

The present invention provides a service type auto-negotiation method and an aggregation device. The method comprises: comparing a service type capability set of a local device with that of a peer device to select a communal service type capability set; configuring a service type on an optical transmission network chip using the highest priority service type in the communal capability set; the service type capability sets including various service types supported by the devices and their corresponding priorities. The method negotiates automatically service types supported by both interconnected devices through a protocol and configures device hardware based on the negotiation result such that service interworking can be achieved without network management, thereby greatly decreasing the complexity of service development.

8 Claims, 3 Drawing Sheets

METHOD FOR AUTOMATICALLY NEGOTIATING TYPE OF SERVICE AND AGGREGATION APPARATUS THEREFOR

TECHNICAL FIELD

The present invention relates to the field of data communication and transmission techniques, and in particular, to an Ethernet service aggregation device and an OTN (Optical Transport Network) service auto-negotiation method thereof.

BACKGROUND ART

An aggregation network in the existing technology as shown in FIG. 1 is composed of an Ethernet switch and a transmission device. The Ethernet switch aggregates low-speed services into high-speed services to transfer to the transmission device for transmission. In this process, the Ethernet switch is responsible for service L2 switching and traffic scheduling, while the transmission device is responsible for encapsulation or de-encapsulation of OTN (Optical Transport Network) frames.

In the existing technology, the transmission device in the aggregation network generally does not detect services type, and lacks service type negotiation mechanism. Therefore, normal transmission of services can be ensured only when a network manager correctly configures service types at two ends of the transmission device, increasing the complexity of service development. Moreover, the implementation method in the existing technology is difficult to provide unified comprehensive maintenance and management function in an aggregation layer.

SUMMARY OF THE INVENTION

A technical problem to be solved by the present invention is to provide an auto-negotiation method and an aggregation device so as to realize auto-negotiation of transmission service types in an OTN network aggregation device.

In order to solve the above technical problem, the present invention provides an auto-negotiation method comprising the following steps of:

comparing a service type capability set of a local device with that of a peer device to select a communal service type capability set;

configuring a service type of an optical transmission network chip as a service type with the highest priority in the communal service type capability set;

the service type capability sets including various service types supported by the devices and their corresponding priorities;

so as to implement the auto-negotiation method of service types.

Furthermore, the method may further comprise:

before comparing the service type capability set of the local device with that of the peer device, configuring the service type of the optical transmission network chip as a transparent transmission mode;

causing the local device to send the service type capability set of the local device to the peer device to transmit transparently to the peer device via the optical transmission network chip; and after receiving the service type capability set of the local device, the peer device transparently transmitting the service type capability set of the peer device to the local device via the optical transmission network chip.

Furthermore, the method may further comprise:

after sending the service type capability set of the local device to the peer device, starting a timer with timing duration being a preset duration threshold, and configuring the optical transmission network chip based on a default service type if the service type capability set sent by the peer device has not yet been received when the timer expires.

Furthermore, the method may further comprise:

selecting the communal service type capability set comprises:

comparing the service type capability set of the local device with that of the peer device to obtain service types supported by both the local device and the peer device; and comparing an ID of the local device with that of the peer device, and in combination with the service types supported by both the local device and the peer device, obtaining the communal service type capability set of the local device and the peer device based on priorities corresponding to service types in the service type capability set of the device with a smaller ID.

Furthermore, the method may further comprise:

after selecting the communal service type capability set, determining whether the communal service type capability set is null, and if yes, configuring the optical transmission network chip based on the default service type; if not, configuring the service type of the optical transmission network chip as the service type with the highest priority in the communal service type capability set.

In order to solve the above technical problem, the present invention further provides an aggregation device comprising a data exchange unit, a transmission unit and a main control unit, wherein:

the data exchange unit is configured to, after receiving a service type capability set of a local device sent by the main control unit, forward the service type capability set of the local device to the transmission unit, and after receiving a service type capability set of a peer device sent by the transmission unit, forward the service type capability set of the peer device to the main control unit;

the transmission unit is configured to configure service types under control of the main control unit, and after receiving the service type capability set of the local device sent by the data exchange unit, forward the service type capability set of the local device to the peer device, and forward the service type capability set of the peer device returned by the peer device to the data exchange unit;

the main control unit is configured to configure a service type of the transmission unit as a transparent transmission mode, execute a negotiation protocol after obtaining the service type capability set of the local device and receiving the service type capability set of the peer device sent by the data exchange unit so as to compare the service type capability set of the local device with that of the peer device to select a communal service type capability set, and configure the service type of the transmission unit as a service type with the highest priority in the communal service type capability set, and send the service type capability set of the local device to the data exchange unit;

the service type capability sets include various service types supported by the devices and their corresponding priorities.

Furthermore, the aggregation device is also characterized in that:

the transmission unit is further configured to, after the main control unit configures the service type of the transmission unit as the service type with the highest priority in the communal service type capability set, perform encapsulation and transmission of service messages sent by the data exchange unit based on the service type.

Furthermore, the aggregation device is also characterized in that:

the aggregation device further comprises a timer;

the timer is configured to be started after the main control unit obtains the service type capability set of the local device and sends the service type capability set of the local device to the data exchange unit, with timing duration being a preset duration threshold;

the main control unit is further configured to configure the transmission unit based on a default service type if the service type capability set of the peer device has not yet been received when the timer expires.

Furthermore, the aggregation device is also characterized in that:

the main control unit compares the service type capability set of the local device with that of the peer device after receiving the service type capability set of the peer device to obtain service types supported by both the local device and the peer device; and the main control unit compares an ID of the local device with that of the peer device, and in combination with the service types supported by both the local device and the peer, obtains the communal service type capability set of the local device and the peer device based on priorities corresponding to service types in the service type capability set of the device with a smaller ID.

Furthermore, the aggregation device is also characterized in that:

the main control unit is further configured to determine whether the communal service type capability set is null after selecting the communal service type capability set, and if yes, configure the transmission unit based on the default service type; if not, configure the service type of the transmission unit as the service type with the highest priority in the communal service type capability set.

The service type auto-negotiation method and the aggregation device in accordance with present invention negotiate automatically service types supported by both interconnected devices through a protocol and configure device hardware based on the negotiation result such that service interworking can be achieved without network management, thereby greatly decreasing the complexity of service development. Moreover, the device integrates Ethernet switching function and transfer function into a unified device platform, thereby decreasing the cost for network construction and device maintenance.

PREFERRED EMBODIMENTS OF THE INVENTION

The present invention will be further described in detail below in conjunction with the accompanying drawings and specific embodiments.

Figure 1:
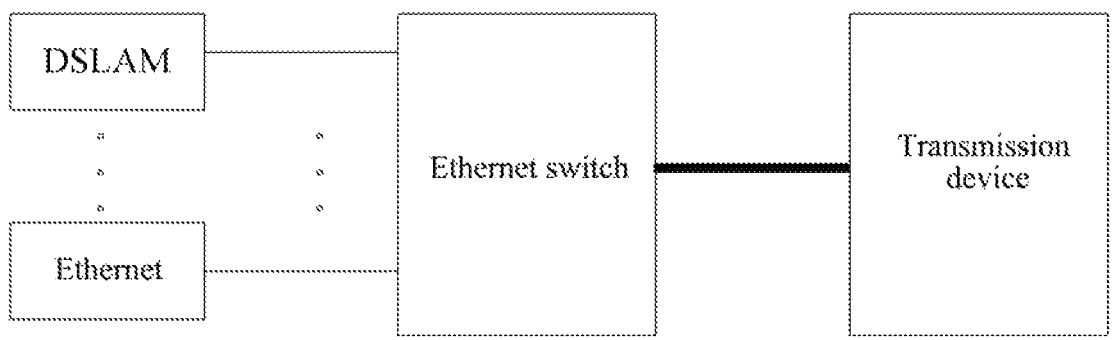
FIG. 1 illustrates networking of a traditional aggregation device.
Figure 2:
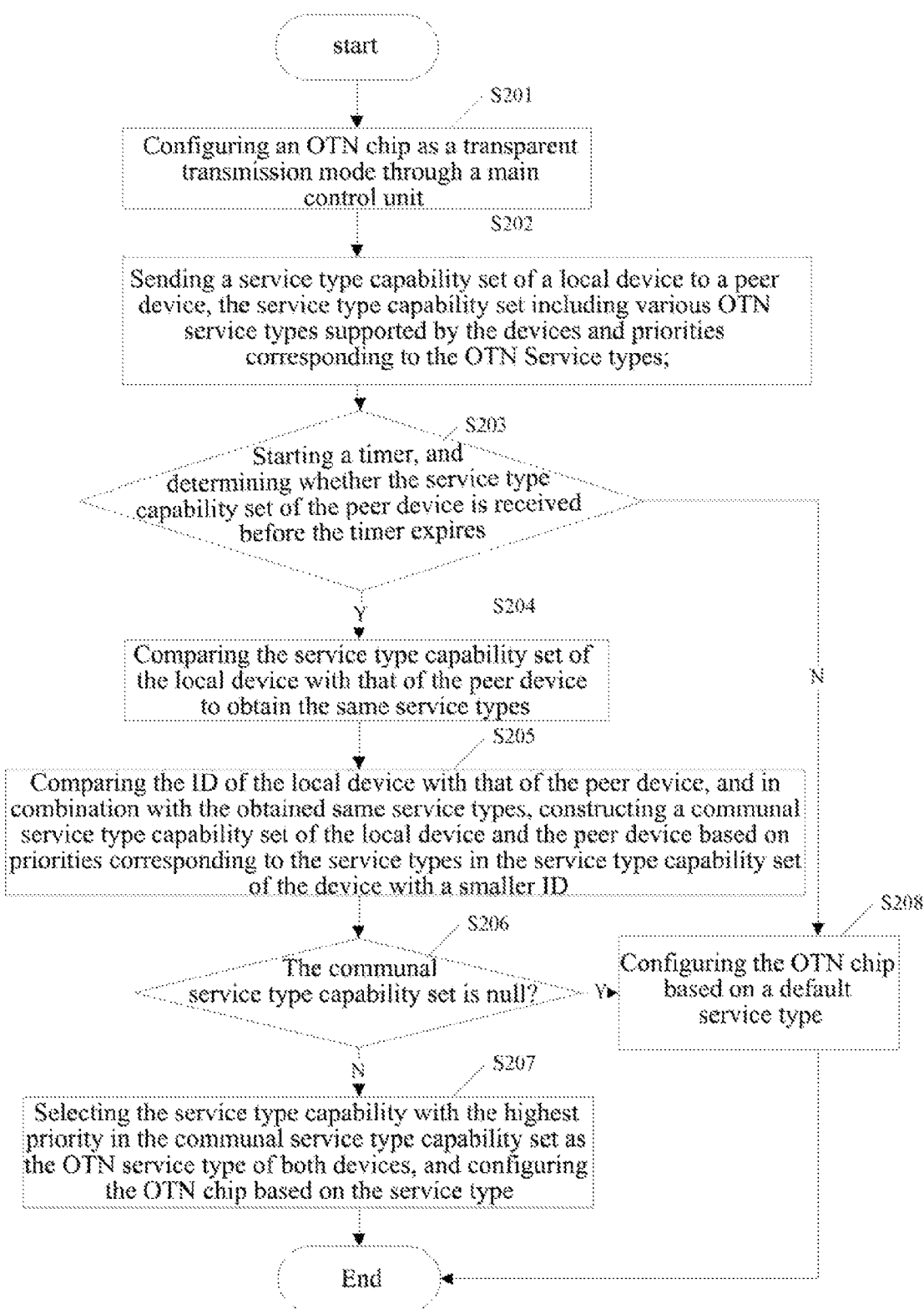
FIG. 2 is a flow chart of a service type auto-negotiation method according to an embodiment of the present invention.

Referring to FIG. 2, a service type auto-negotiation method according to an embodiment of the present invention is shown, which comprises the following steps.

Step S201: a main control unit configures a service type of an OTN chip as a transparent transmission mode.

This step is intended to establish a channel for signaling interaction.

Step S202: a service type capability set of the local device is sent to the peer device, wherein the service type capability set includes various OTN service types supported by the devices and priorities corresponding to the OTN service types;

In concrete implementation, the OTN service types supported by different devices are different, and the selected service priorities may also be different. For example, as shown in Table 1, the service type capability set of the device includes three supported service types, OTU 11.1, OUT GFP and OUT transparent transmission respectively, with priorities being 0, 1, and 3 respectively, wherein, the priority of 0 is the highest priority. These three services is arranged as OTU 11.1>OUT GFP>OUT transparent transmission according to the descending order of the priorities.

TABLE 1

| OTN Service type capability set | |
| --- | --- |
| Service type | Priority |
| OTU 11.1 | 0 |
| OUT GFP | 1 |
| OUT transparent transmission | 3 |

Step S203: a timer is started with timing duration being a preset duration threshold, and if the service type capability set of the peer device is received before the timing time of the timer is reached, the process proceeds to S204; if the service type capability set of the peer device has not yet been received when the timing time of the timer is reached, the process proceeds to S208.

Step S204: the service type capability set of the local device is compared with that of the peer device, and if the same service types are obtained, the process proceeds to step S205.

Step S205: the ID (i.e., MAC address) of the local device is compared with that of the peer device, and in combination with the same service types obtained in step S204, a communal service type capability set of the local device and the peer device is constructed based on the priorities corresponding to the service types in the service type capability set of the device with a smaller ID.

For example, in concrete implementation, the ID of the local device is 00:11:d0:c0:a0:00, and its service type capability set is shown in Table 1; and the ID of the peer device is 00:11:22:33:33:44, and its service type capability set is shown in Table 2.

TABLE 2

| OTN service type capability set of the peer device | |
| --- | --- |
| Service type | Priority |
| OUT transparent transmission | 0 |
| OUT GFP | 1 |

It can be seen by comparing Table 1 with Table 2 that the same supported service types are OUT transparent transmission and OUT GFP. Since the ID of the peer device is smaller than that of the local device, a communal service type capability set of the local device and the peer device, as shown in Table 3, is obtained based on the priorities corresponding to the service types in the service type capability set of the peer device, i.e., based on the priorities corresponding to the service types in Table 2.

TABLE 3

Communal OTN service type capability set

| Service type | Priority |
|---|---|
| OUT transparent transmission | 0 |
| OUT GFP | 1 |

Step S206: it is determined whether the communal service type capability set is null, and if not, step S207 is executed; and if yes, step S208 is executed.

Step S207: the service type capability with the highest priority in the communal service type capability set is selected as the OTN service type of both devices, and the OTN chip is configured based on the service type, the process ends.

Taking the communal service type capability set shown in Table 3 as an example, the OUT transparent transmission mode is selected as the service type of both devices to configure the OTN chip.

Step S208: the OTN chip is configured based on a default service type.

Figure 3:
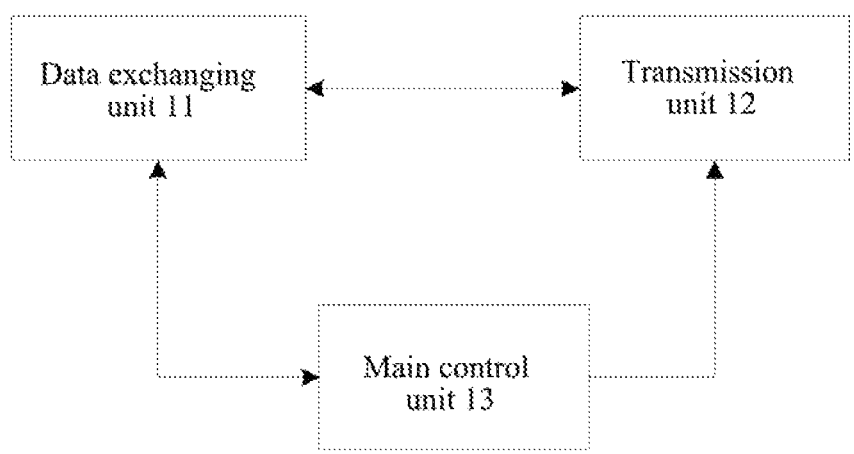
FIG. 3 is a block diagram of an aggregation device according to an embodiment of the present invention.

In order to carry out the above method, the present invention further provides an aggregation device for realizing integration of data and transmission devices, which, as specifically shown in FIG. 3, comprises a data exchange unit 11, a transmission unit 12 and a main control unit 13.

The data exchange unit 11 is responsible for processing service attributes, such as L2 switching of Ethernet services, traffic scheduling and service types, receiving negotiation messages of the main control unit 13 and sending the messages to the transmission unit 12.

The transmission unit 12 is responsible for OTN framing or deframing of service messages, and setting the specific service types of the OTN in response to the configuration of the main control 13.

The main control unit 13 is responsible for processing negotiation of the service types of the OTN, extracting a negotiated capability set, and configuring the transmission unit 12, as well as processing basis L2 protocols.

Specifically, for the process of negotiation of the service types in the embodiment of the present invention, functions of the data exchange unit 11, the transmission unit 12 and the main control unit 13 will be described below.

The data exchange unit 11 is configured to, after receiving a service type capability set of a local device sent by the main control unit 13, forward the service type capability set of the local device to the transmission unit 12, and after receiving a service type capability set of a peer device sent by the transmission unit 12, forward the service type capability set of the peer device to the main control unit 13.

The transmission unit 12 is configured to configure service types under control of the main control unit 13, and after receiving the service type capability set of the local device sent by the data exchange unit 11, forward the service type capability set of the local device to the peer device, and forward the service type capability set of the peer device returned by the peer device to the data exchange unit 11.

The main control unit 13 is configured to configure the service type of the transmission unit as a transport transmission mode, and then execute a negotiation protocol, obtain the service type capability set of the local device and send it to the data exchange unit 11, control the peer device to obtain the service type capability set of the peer device sand end it to the transmission unit 12 after receiving the service type capability set of the local device, and compare the service type capability set of the local device with that of the peer device to select a communal service type capability set, configure the service type of the transmission unit 12 as a service type with the highest priority in the communal service type capability set. The service type capability set includes various service types supported by the devices and their corresponding priorities.

The main control unit 13 is further configured to compare the service type capability set of the local device with that of the peer device after receiving the service type capability set of the peer device to obtain service types supported by both the local device and the peer device; compare an ID of the local device with that of the peer device, and in combination with the service types supported by both the local device and the peer device, obtain the communal service type capability set of the local device and the peer device based on the priorities corresponding to service types in the service type capability set of the device with a smaller ID.

The main control unit 13 starts a timer (not shown in the figure) with timing duration of being a preset duration threshold after obtaining the service type capability set of the local device and sending it to the data exchange unit 11, and configures the transmission unit 12 based on the default service type if the service type capability set of the peer device has not yet been received when the timing time of the timer is reached.

The main control unit 13 is also required to determine whether the communal service type capability set is null after selecting the communal service type capability set, and if yes, configure the transmission unit 12 based on the default Service type; if not, configure the service type of the transmission unit 12 as the service type with the highest priority in the communal service type capability set.

After the service type of the transmission unit 12 is configured as the service type with the highest priority in the communal service type capability under control of the main control unit 13, a service message sent by the transmission unit 12 is received, and encapsulation and transmission of messages is performed based on the service type.

The present invention may have many other embodiments and various corresponding modifications and variations may be made by those skilled in the art without departing from the spirit and essence of the present invention. All these corresponding modifications and variations, however, should be within the protection scope defined by the attached claims of the present invention.

INDUSTRIAL APPLICABILITY

The service type auto-negotiation method and the aggregation device in accordance with present invention negotiate automatically service types supported by both interconnected devices through a protocol and configure device hardware based on the negotiation result such that service interworking can be achieved without network management, thereby greatly decreasing the complexity of service development. Moreover, the device integrates Ethernet switching function and transfer function into a unified device platform, thereby decreasing the cost for network construction and device maintenance.

What is claimed is:

1. An auto-negotiation method comprising the following steps of:
   comparing a service type capability set of a local device with that of a peer device to select a communal service type capability set;
   configuring a service type of an optical transmission network chip as a service type with the highest priority in the communal service type capability set;
   the service type capability set of the local device including service types supported by the local device and priorities corresponding to the service types supported by the local device, and the service type capability set of the peer device including service types supported by the peer device and priorities corresponding to the service types supported by the peer device;
   thereby implementing the auto-negotiation method of service types;
   wherein the step of selecting the communal service type capability set comprises:
   comparing the service type capability set of the local device with that of the peer device to obtain service types supported by both the local device and the peer device; and
   comparing an ID of the local device with that of the peer device, and in combination with the service types supported by both the local device and the peer device, obtaining the communal service type capability set of the local device and the peer device by taking priorities corresponding to service types in the service type capability set of one of the local device and the peer device with a smaller ID as priorities of the service types supported by both the local device and the peer device.

2. The auto-negotiation method according to claim 1, further comprising:
   before the step of comparing the service type capability set of the local device with that of the peer device,
   configuring the service type of the optical transmission network chip as a transparent transmission mode;
   causing the local device to send the service type capability set of the local device to the peer device to transmit transparently to the peer device via the optical transmission network chip; and
   after receiving the service type capability set of the local device, the peer device transparently transmitting the service type capability set of the peer device to the local device via the optical transmission network chip.

3. The auto-negotiation method according to claim 2, further comprising:
   after the step of causing the local device to send the service type capability set of the local device to the peer device, starting a timer with timing duration being a preset duration threshold, and configuring the optical transmission network chip based on a default service type if the service type capability set sent by the peer device has not yet been received when timing time of the timer is reached.

4. The auto-negotiation method according to claim 1, further comprising:
   after the step of selecting the communal service type capability set,
   determining whether the communal service type capability set is null, and if yes, configuring the optical transmission network chip based on the default service type; if not, configuring the service type of the optical transmission network chip as the service type with the highest priority in the communal service type capability set.

5. An aggregation device comprising a data exchange unit, a transmission unit and a main control unit, wherein:
   the data exchange unit is configured to, after receiving a service type capability set of a local device sent by the main control unit, forward the service type capability set of the local device to the transmission unit, and after receiving a service type capability set of a peer device sent by the transmission unit, forward the service type capability set of the peer device to the main control unit;
   the transmission unit is configured to configure service types under control of the main control unit, and after receiving the service type capability set of the local device sent by the data exchange unit, forward the service type capability set of the local device to the peer device, and forward the service type capability set of the peer device returned by the peer device to the data exchange unit;
   the main control unit is configured to configure a service type of the transmission unit as a transparent transmission mode, execute a negotiation protocol after obtaining the service type capability set of the local device and receiving the service type capability set of the peer device sent by the data exchange unit so as to compare the service type capability set of the local device with that of the peer device to select a communal service type capability set, and configure the service type of the transmission unit as a service type with the highest priority in the communal service type capability set, and send the service type capability set of the local device to the data exchange unit;
   the service type capability set of the local device includes service types supported by the local device and priorities corresponding to the service types supported by the local device, and the service type capability set of the peer device includes service types supported by the peer device and priorities corresponding to the service types supported by the peer device;
   wherein the main control unit is configured to compare the service type capability set of the local device with that of the peer device to obtain service types supported by both the local device and the peer device, and compare an ID of the local device with that of the peer device, and in combination with the service types supported by both the local device and the correspondent, obtain the communal service type capability set of the local device and the correspondent device by taking priorities corresponding to service types in the service type capability set of one of the local device and the correspondent device with a smaller ID as priorities of the service types supported by both the local device and the peer device.

6. The aggregation device according to claim 5, wherein the transmission unit is further configured to, after the main control unit configures the service type of the transmission unit as the service type with the highest priority in the communal service type capability set, perform encapsulation and transmission of service messages sent by the data exchange unit based on the service type.

7. The aggregation device according to claim 5, wherein the aggregation device further comprises a timer,
   the timer is configured to be started after the main control unit obtains the service type capability set of the local device and sends the service type capability set of the local device to the data exchange unit, timing duration of the timer being a preset duration threshold;
   the main control unit is further configured to configure the transmission unit based on a default service type if the service type capability set of the peer device has not yet been received when timing time of the timer is reached.

8. The aggregation device according to claim 5, wherein the main control unit is further configured to determine whether the communal service type capability set is null after selecting the communal service type capability set, and if yes, configure the service type of the transmission unit based on the default service type; if not, configure the service type of the transmission unit as the service type with the highest priority in the communal service type capability set.

* * * * *